United States Patent [19]
Fogarty

[11] Patent Number: 5,653,460
[45] Date of Patent: Aug. 5, 1997

[54] CHILD STROLLER WITH A DUAL SEATING CAPABILITY

[76] Inventor: Margaret A. Fogarty, Roo, Killoskehane, Borrisoleigh, Thurles, Co. Tipperary, Ireland

[21] Appl. No.: 529,763

[22] Filed: Sep. 18, 1995

[51] Int. Cl.$^6$ .................................................. B62B 7/06
[52] U.S. Cl. ..................... 280/642; 280/647; 280/658
[58] Field of Search ............................. 280/288.4, 290, 280/293, 304.1, 642, 647, 657, 658, 47.38, 30

[56] References Cited

U.S. PATENT DOCUMENTS

| | | | |
|---|---|---|---|
| 4,542,915 | 9/1985 | Wheeler, III et al. | 280/658 |
| 4,854,607 | 8/1989 | Mandracchia et al. | 280/290 |
| 4,986,564 | 1/1991 | Liu | 280/642 |
| 5,033,761 | 7/1991 | Kelly | 280/47.38 |

Primary Examiner—Richard M. Camby

[57] ABSTRACT

A child stroller with a dual seating capability comprising a stroller having a frame formed of tubes with wheels on the lower extent thereof, and with a first seat supported by the tubes for receipt of a child in the seated position, the frame including a pair of laterally spaced angular tubular members extending upwardly and rearwardly at an angle and then with rearwardly extending portions in a horizontally disposed orientation, the horizontally disposed tubes being of an extended length with forward ends coupled to the upper extents of the angular tubular members, the horizontally disposed tubes having at their rearward end generally U-shaped handles for being held by an adult pushing the stroller, a supplemental frame formed of a backpack having horizontal extents positionable above the horizontally disposed tubes of the stroller and being curved downwardly and inwardly to a location beneath the horizontally disposed tubes of the primary stroller, a second seat mounted with respect to the horizontal extents of the backpack for receiving therein a child in a seated orientation; and the vertical tubes coupled to the horizontally disposed tubes of the stroller, the vertical tubes having at their lower ends wheels at a common elevational orientation with respect to the wheels of the stroller.

4 Claims, 4 Drawing Sheets

CHILD STROLLER WITH A DUAL SEATING CAPABILITY

BACKGROUND OF THE INVENTION

1. Field of the Invention

The present invention relates to a child stroller with a dual seating capability and more particularly pertains to transporting two children simultaneously, one in a stroller and the other in a backpack releasably supported by the stroller.

2. Description of the Prior Art

The use of strollers and backpacks of various designs and configurations is known in the prior art. More specifically, strollers and backpacks of various designs and configurations heretofore devised and utilized for the purpose of transporting children by various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,725,071 a tandem stroller.

U.S. Pat. No. 4,728,112 discloses a tandem two seat child's stroller.

U.S. Pat. No. Des. 321,850 discloses the design of a tandem seat baby stroller.

U.S. Pat. No. Des. 296,540 discloses the design of a twin stroller.

Lastly, U.S. Pat. No. Des. 328,047 discloses the design of a tandem stroller.

In this respect, the child stroller with a dual seating capability according to the present invention substantially departs from the conventional concepts and designs of the prior art, and in so doing provides an apparatus primarily developed for the purpose of transporting two children simultaneously, one in a stroller and the other in a backpack releasably supported by the stroller.

Therefore, it can be appreciated that there exists a continuing need for new and improved child stroller with a dual seating capability which can be used for transporting two children simultaneously, one in a stroller and the other in a backpack releasably supported by the stroller. In this regard, the present invention substantially fulfills this need.

SUMMARY OF THE INVENTION

In view of the foregoing disadvantages inherent in the known types of strollers and backpacks of various designs and configurations now present in the prior art, the present invention provides an improved child stroller with a dual seating capability. As such, the general purpose of the present invention, which will be described subsequently in greater detail, is to provide a new and improved child stroller with a dual seating capability apparatus and method which has all the advantages of the prior art and none of the disadvantages.

To attain this, the present invention essentially comprises a new and improved child stroller with a dual seating capability comprising, in combination a stroller having a frame formed of tubes with wheels on the lower extent thereof, and with a first seat supported by the tubes for receipt of a child in the seated position, the frame including a pair of laterally spaced angular tubular members extending upwardly and rearwardly at an angle and then with rearwardly extending portions in a horizontally disposed orientation, the horizontally disposed tubes being of an extended length with forward ends pivotally coupled to the upper extents of the angular tubular members, the horizontally disposed tubes having at their rearward end generally U-shaped handles for being held by an adult pushing the stroller, a supplemental frame formed of a backpack having horizontal extents positionable above the horizontally disposed tubes of the stroller and being curved downwardly and inwardly to a location beneath the horizontally disposed tubes of the primary stroller, a second seat mounted with respect to the horizontal extents of the backpack for receiving therein a child in a seated orientation and the vertical tubes coupled to the horizontally disposed tubes of the stroller and pivotable with respect thereto, the vertical tubes having at their lower ends wheels at a common elevational orientation with respect to the wheels of the stroller.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child stroller with a dual seating capability which has all the advantages of the prior art strollers and backpacks of various designs and configurations and none of the disadvantages.

It is another object of the present invention to provide a new and improved child stroller with a dual seating capability which may be easily and efficiently manufactured and marketed.

It is a further object of the present invention to provide a new and improved child stroller with a dual seating capability which is of a durable and reliable construction.

An even further object of the present invention is to provide a new and improved child stroller with a dual seating capability which is susceptible of a low cost of manufacture with regard to both materials and labor, and which accordingly is then susceptible of low prices of sale to the consuming public, thereby making such strollers and backpacks of various designs and configurations economically available to the buying public.

Still yet another object of the present invention is to provide a new and improved child stroller with a dual seating capability which provides in the apparatuses and methods of the prior art some of the advantages thereof, while simultaneously overcoming some of the disadvantages normally associated therewith.

Still another object of the present invention is to transporting two children simultaneously, one in a stroller and the other in a backpack releasably supported by the stroller.

Lastly, it is an object of the present invention to provide new and improved child stroller with a dual seating capability comprising a stroller having a frame formed of tubes with wheels on the lower extent thereof, and with a first seat supported by the tubes for receipt of a child in the seated position, the frame including a pair of laterally spaced angular tubular members extending upwardly and rearwardly at an angle and then with rearwardly extending portions in a horizontally disposed orientation, the horizontally disposed tubes being of an extended length with forward ends coupled to the upper extents of the angular tubular members, the horizontally disposed tubes having at their rearward end generally U-shaped handles for being held by an adult pushing the stroller, a supplemental frame formed of a backpack having horizontal extents positionable above the horizontally disposed tubes of the stroller and being curved downwardly and inwardly to a location beneath the horizontally disposed tubes of the primary stroller, a second seat mounted with respect to the horizontal extents of the backpack for receiving therein a child in a seated orientation and the vertical tubes coupled to the horizontally disposed tubes of the stroller, the vertical tubes having at their lower ends wheels at a common elevational orientation with respect to the wheels of the stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
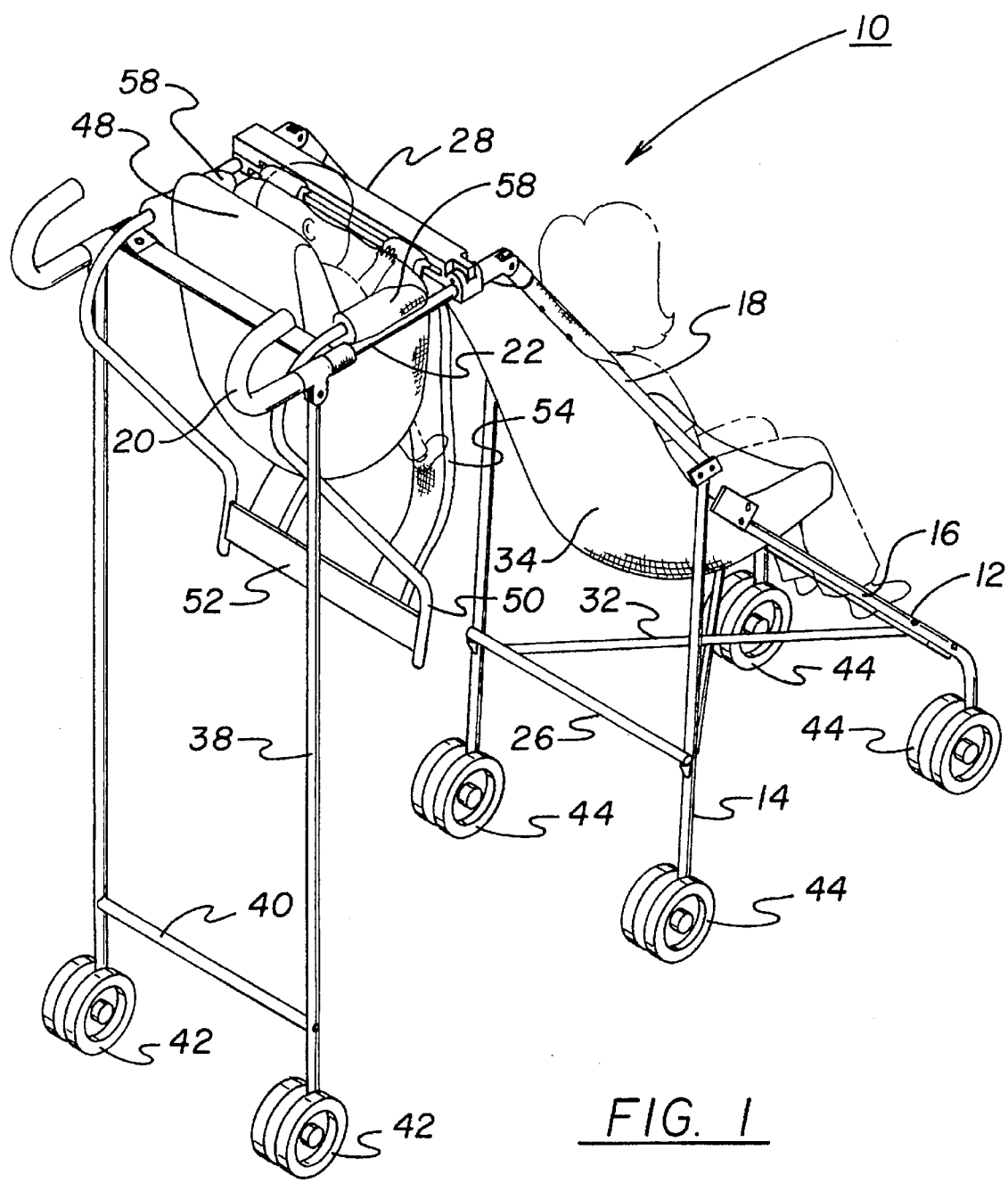
FIG. 1 is a perspective illustration of the preferred embodiment of the child stroller with a dual seating capability constructed in accordance with the principles of the present invention.
Figure 2:
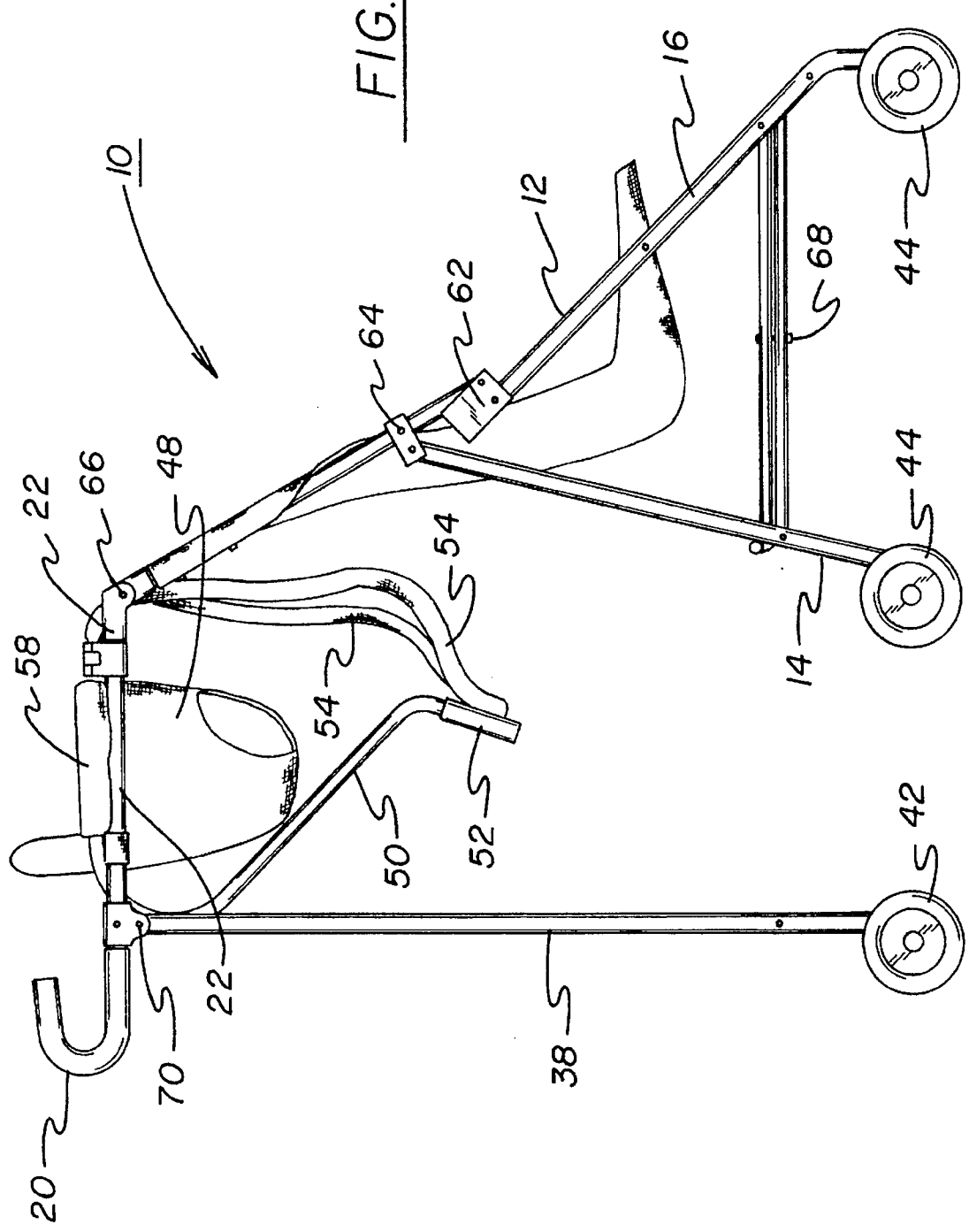
FIG. 2 is a side elevational view of the apparatus shown in FIG. 1.
Figure 3:
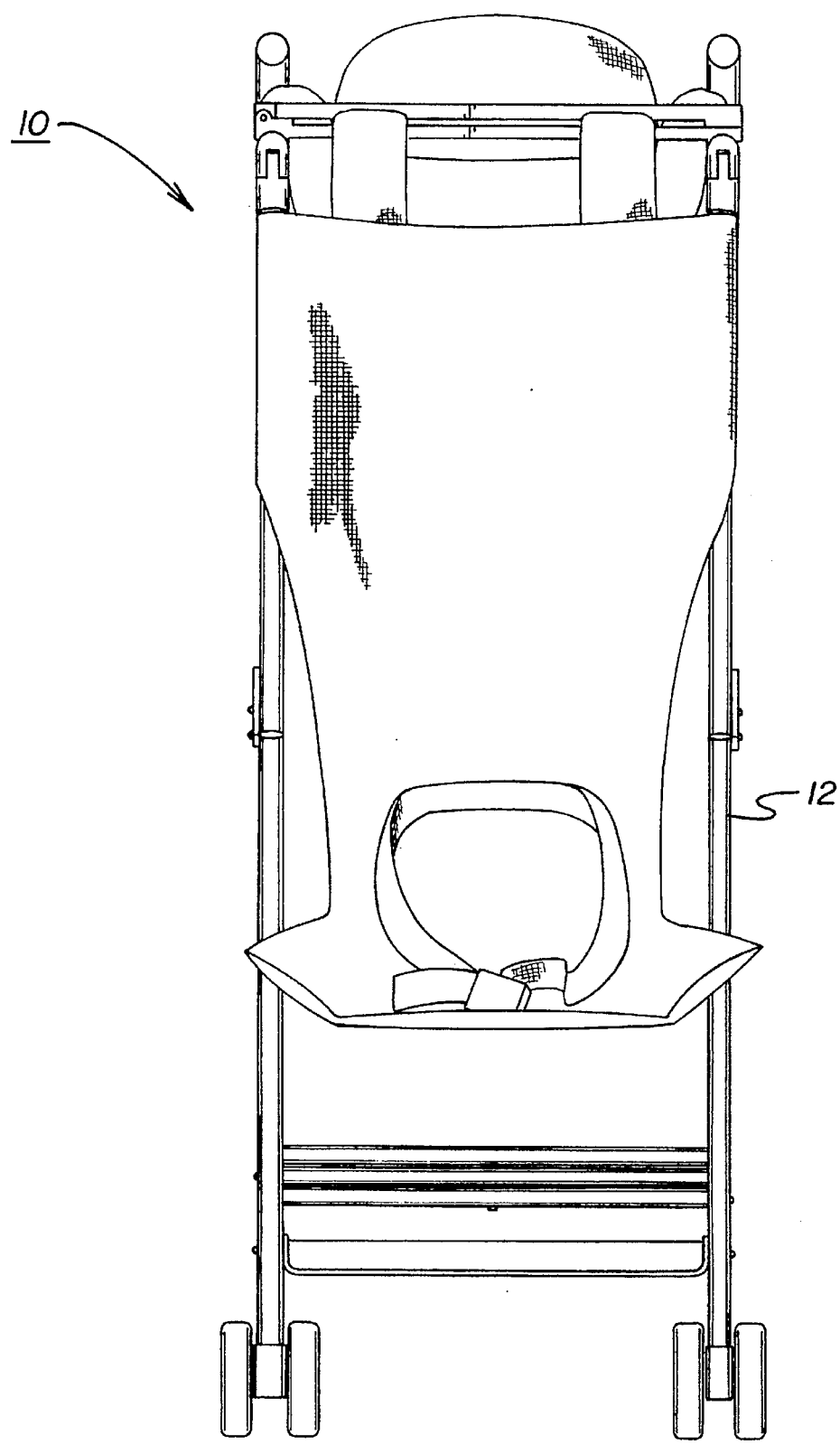
FIG. 3 is a front elevational view of the apparatus of the prior Figure.
Figure 4:
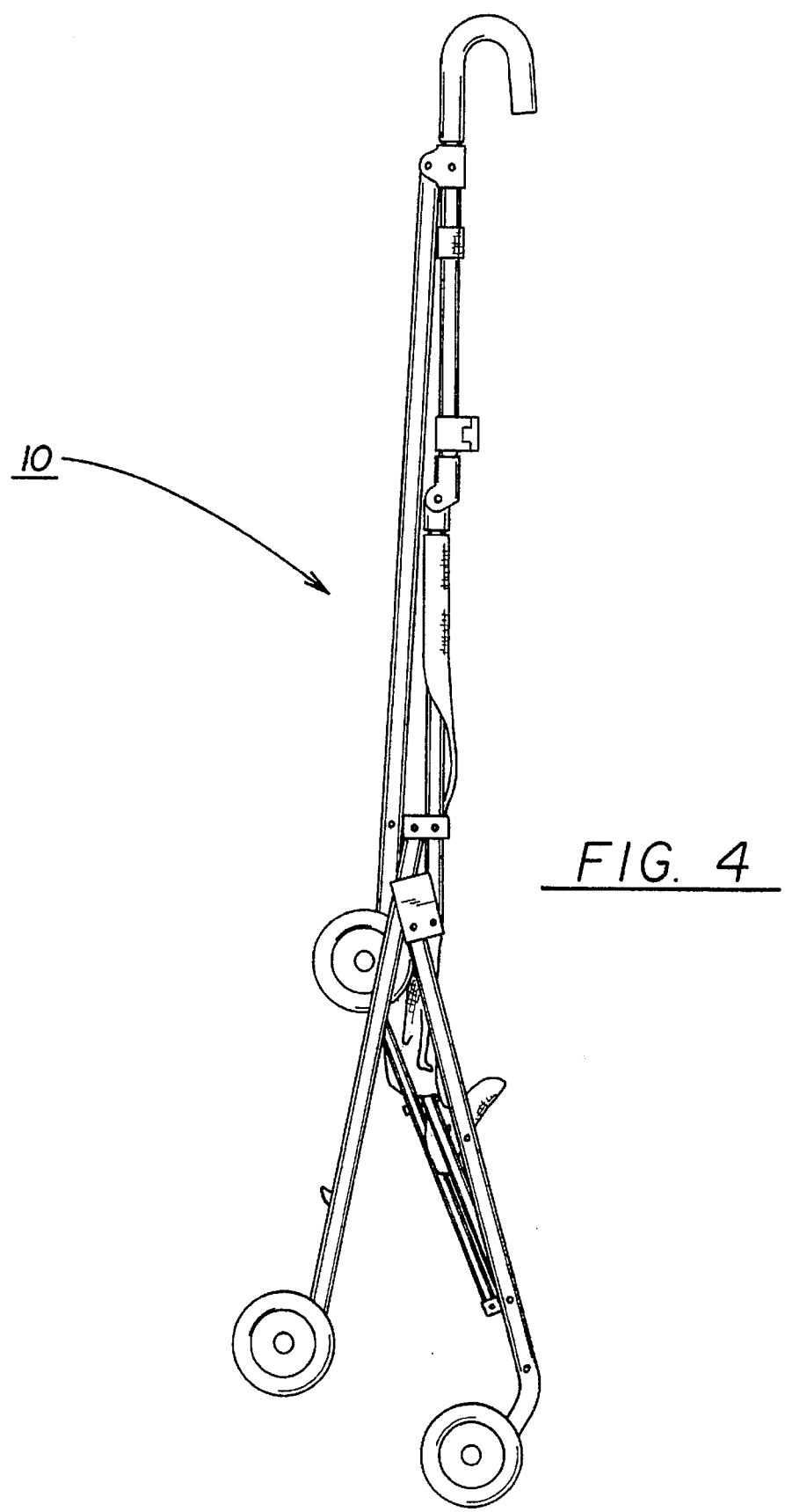
FIG. 4 is a side elevational view of the apparatus of the prior Figures but in a folded orientation.

With reference now to the drawings, and in particular to FIG. 1 thereof, a new and improved child stroller with a dual seating capability embodying the principles and concepts of the present invention and generally designated by the reference numeral 10 will be described.

The present invention, the new and improved child stroller with a dual seating capability, is comprised of a plurality of components. Such components in their broadest context include a stroller, a supplemental frame formed of a backpack, a second seat and vertical tubes. Such components are individually configured and correlated with respect to each other so as to attain the desired objective.

There is shown in FIG. 1 the new improved child's stroller 10 with dual seating capability. The primary component of the system is a frame 12. Such stroller is formed with tubes 14 and 16 with wheels 44 on the lower extents thereof. In addition, a first seat 34 is supported by the tubes. The seat is for the receipt of a child in the stroller when in a seated position.

The frame 12 also includes a pair of laterally-spaced angular tubular members 16. Such members extend upwardly and rearwardly at an angle. They then terminate in handles 20 formed in a generally U-shaped configuration. Between the handles and the upper ends of the angular tubular members are extended portions 22 in a horizontally-disposed orientation. The horizontally-disposed tubes are of an extended length with forward ends pivotally coupled to the upper extents of the angular tubular members. The horizontally-disposed tubes have their rearward ends terminating in the generally U-shaped handles. These are for being held by an adult pushing the stroller.

Next provided is a supplemental lateral support formed as tubes 26, 28, etc. for holding the side portions of the frame properly spaced laterally with respect to each other. The lateral support 28 is pivotable to allow separation of one side frame 22 from the adjacent side frame when being collapsed. X-shaped support rod 32 beneath the seat adds stability to the frame 12 of the stroller and security to the child in the seat 34.

Additional vertical legs 38 provide elevational integrity to the rear ends of the horizontally-disposed tubes 22. A cross tube 40 maintains such vertically-disposed tubes at their proper spaced orientation with respect to each other. Such tubes 38 are pivotable at their upper ends with respect to the horizontally-disposed tubes to facilitate the collapse thereof. At the lower end of the vertical tubes 38 are wheels 42 at a common elevational orientation with respect to the wheels 44 of the stroller. As a result, the entire system is a six-wheeled vehicle with the front wheels preferably formed as casters to facilitate the turning thereof during operation and use.

Next provided is a backpack 48. The backpack includes a plurality of support members including S-shaped rods 50 which are conventional for supporting the backpack when use or not in the stroller. Struts 54 also depend from the backpack to a lower extent and preclude a child within the seat of the backpack from kicking an occupant therein front. A supplemental transverse strap 52 maintains the S-shaped rods at properly laterally-spaced relationships. In addition, horizontally-disposed frame members 58 with padded supports are spaced laterally on opposite sides of the backpack seat for being received by the horizontally-disposed tubes of the stroller. In this manner, the backpack and child may be readily placed within the upper rear of the stroller and removed therefrom.

A parent with two children being six months old and two years old often have difficulty when out walking with both children. Having the younger child in a stroller means the older child must walk all the time. When folding up the stroller the parent must manipulate the action of folding with holding the younger child in their arms and watching the older child. As a nanny with experience of this situation, it is not easy regardless of how easily the stroller folds.

Carrying the younger child in a backpack eases the situation but cannot be done for long period of time. Therefore, I believe my idea for an alternative stroller would be good.

The front is the same as a basic stroller. However, the handlebars would extend backwards and be designed to hold a backpack frame. The stroller would remain balanced due to two more wheels extending from the handlebars at the back. The backpack would be held in place by a strap linking the two handle bars. When required, the backpack can be removed and placed on the user's back. This provides an easier means of folding the stroller and entering buses, etc. with the younger child secure in the backpack. A special carrier bag could also be designed to hang from the handlebars for those parents who have one child and wish to shop without fear of overloading the stroller. Also, this stroller allows the older child to get out and walk without fear of unbalancing the stroller with either the baby or shopping on the back.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved child stroller with a dual seating capability comprising, in combination:

a stroller having a frame formed of tubes with wheels on the lower extent thereof, and with a first seat supported by the tubes for receipt of a child in the seated position, the frame including a pair of laterally spaced angular tubular members extending upwardly and rearwardly at an angle and then with rearwardly extending portions in a horizontally disposed orientation, the horizontally disposed tubes being of an extended length with forward ends pivotally coupled to the upper extents of the angular tubular members, the horizontally disposed tubes having at their rearward end generally U-shaped handles for being held by an adult pushing the stroller;

a supplemental frame formed of a backpack having horizontal extents positionable above the horizontally disposed tubes of the stroller and being curved downwardly and inwardly to a location beneath the horizontally disposed tubes of the primary stroller;

a second seat mounted with respect to the horizontal extents of the backpack for receiving therein a child in a seated orientation; and vertical tubes coupled to the horizontally disposed tubes of the stroller and pivotable with respect thereto, the vertical tubes having at their lower ends wheels at a common elevational orientation with respect to the wheels of the stroller.

2. A child stroller comprising:

a stroller having a frame formed of tubes with wheels on the lower extent thereof, and with a first seat supported by the tubes for receipt of a child in the seated position, the frame including a pair of laterally spaced angular tubular members extending upwardly and rearwardly at an angle and then with rearwardly extending portions in a horizontally disposed orientation, the horizontally disposed tubes being of an extended length with forward ends coupled to the upper extents of the angular tubular members, the horizontally disposed tubes having at their rearward end generally U-shaped handles for being held by an adult pushing the stroller; and vertical tubes coupled to the horizontally disposed tubes of the stroller, the vertical tubes having at their lower ends wheels at a common elevational orientation with respect to the wheels of the stroller.

3. The stroller as set forth in claim 2 and further including:

a supplemental frame formed of a backpack having horizontal extents positionable above the horizontally disposed tubes of the stroller and being curved downwardly and inwardly to a location beneath the horizontally disposed tubes of the primary stroller;

a second seat mounted with respect to the horizontal extents of the backpack for receiving therein a child in a seated orientation.

4. The stroller as set forth in claim 2 and further including pivot means coupling the tubular components of the stroller for the collapsing thereof for storage and transportation.

* * * * *